Figure 1:
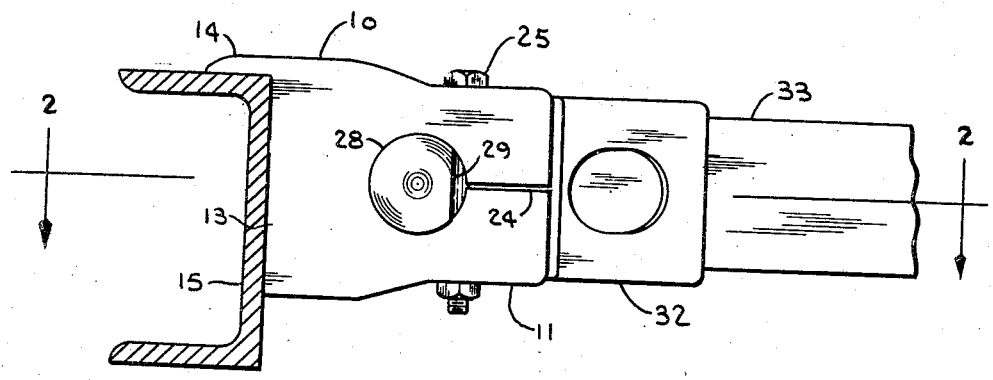

Oct. 14, 1947.                    D. S. WEISS                   2,428,950
                        VEHICLE DRAFT TONGUE MOUNTING
                        Filed July 17, 1945            3 Sheets-Sheet 1

DEWEY S. WEISS
*INVENTOR.*

BY
ATTORNEY

Oct. 14, 1947.    D. S. WEISS    2,428,950
VEHICLE DRAFT TONGUE MOUNTING
Filed July 17, 1945    3 Sheets-Sheet 3

DEWEY S. WEISS
INVENTOR.

BY
ATTORNEY

Patented Oct. 14, 1947

2,428,950

UNITED STATES PATENT OFFICE 2,428,950

VEHICLE DRAFT TONGUE MOUNTING

Dewey S. Weiss, Portland, Oreg.

Application July 17, 1945, Serial No. 605,524

20 Claims. (Cl. 280—33.9)

The present invention relates to vehicle draft tongue mounting arrangements and, while it is not necessarily limited thereto, it is particularly suitable for use in mounting tongues of automotive truck trailer vehicles.

For coupling trailers onto the rear ends of prime mover truck vehicles a tongue is provided which usually consists of a pair of angularly arranged arms, the spaced apart outer ends of which are hingedly secured to the front wheel bolster of the trailer. An eye is provided at the apex of the tongue arms which is adapted to be received in a pintle hook mounted on the rear end of the truck. In effecting coupling of the truck to the trailer the tongue must be held in a substantially horizontal position while the truck is backed up to the trailer so that the eye may be positioned upon the hook and locked in place. Sometimes an assistant is required to hold the tongue in such horizontal position but it is desirable to provide means for automatically holding the tongue in the horizontal position so that the coupling may be effected without requiring the services of an assistant for such purpose. Arrangements have been provided heretofore for holding the trailer tongue in a substantially horizontal position but such arrangements have usually been relatively complicated, expensive and costly to maintain.

It is a general object of the present invention to provide a new and improved trailer tongue mounting arrangement which is of relatively simple design, of low manufacturing cost and of sturdy construction.

A further object of the present invention is to provide a new and improved trailer tongue mounting arrangement comprised of relatively few parts and which may readily be assembled or disassembled as for replacement or repair.

In accordance with the illustrated embodiments, the invention is comprised of a pair of supporting block members adapted to be rigidly attached to the front wheel bolster of the trailer and a pair of cooperating annular elements adapted to be rigidly attached to each of the tongue arms. Each of the last mentioned elements are secured to the corresponding supporting member by means of a connecting pin and a compressible bushing arranged therebetween, the pin being so designed and capable of adjustment whereby the bushing may be compressed to effect a substantially tight connection between the tongue and the fixed supporting member whereby the tongue is normally held in a substantially horizontal position but is capable of hinging movement about the pin as may be required for travel.

Further objects and advantages of the invention will appear from the following description taken in connection with the accompanying drawings while the features of novelty will be pointed out with greater particularity in the appended claims.

Figure 2:
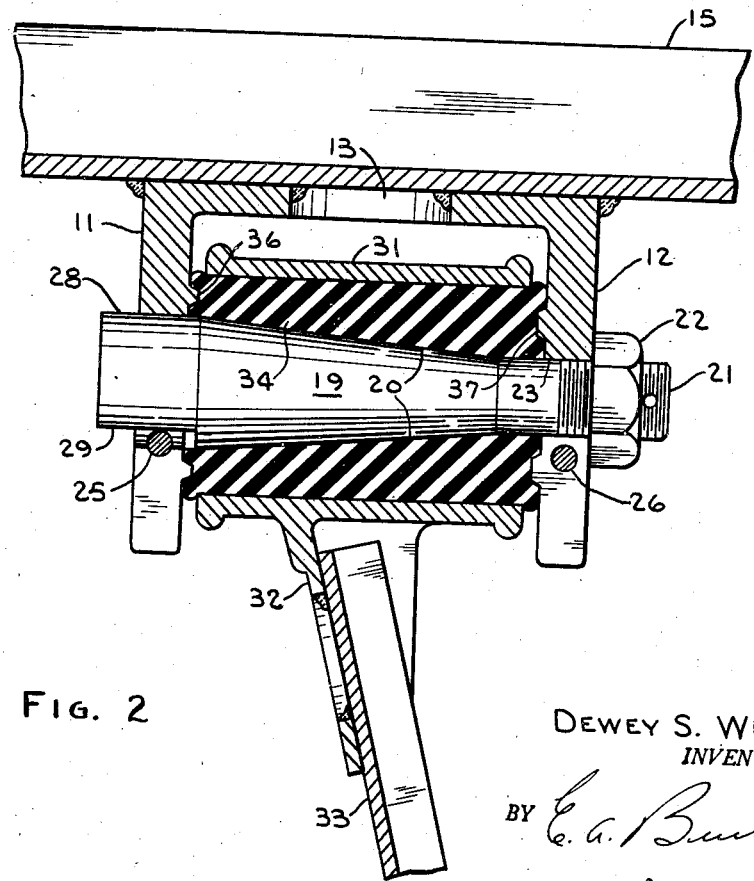

In the drawings, Fig. 1 is a side elevation illustrating the tongue mounting arrangement as constructed in accordance with one form of the present invention; Fig. 2 is a cross-sectional view taken along the line 2—2 of Fig. 1; Figs. 3, 4, 5, and 6 are cross-sectional views corresponding to that of Fig. 2 but illustrating further modifications of the inventions.

Referring first to the modification illustrated in Figs. 1 and 2, the tongue mounting arrangement shown comprises a supporting member 10 of generally rectangular U-shape comprising a pair of laterally spaced parallel flanges 11 and 12 which are integrally united by a rear portion 13. The upper edge of the member 10 is further provided with a rearwardly extending flange portion 14. The supporting member 10 is adapted to be rigidly secured, such as by welding to the forward transverse frame member 15 of the front wheel bolster of a trailer vehicle. It is to be understood that two such supporting members 10 are provided, one adjacent each of the opposite sides of the bolster and within which are mounted the ends of the angularly extending arms of the tongue. For sake of greater clarity in the drawings a mounting structure for only one of the tongue arms is shown.

A pin indicated generally at 19 extends in a horizontal direction through cooperating aligned openings provided in the flanges 11 and 12 and is longitudinally adjustable therein. The pin is of relatively large diameter at one end and a relatively small diameter at the opposite end and is tapered between the flanges 11 and 12, the tapered portion being indicated at 20. The small diameter end 21 of the pin 19 projects from the outer surface of the adjacent flange 12 and is threaded for cooperatively receiving the adjusting nut 22 thereupon. The pin 19 is longitudinally adjustable and which may be effected by the nut 22 it being observed that the cylindrical diameter of the small end portion of the pin 19 continues for a suitable distance adjacent the inner surface of the flange 12 as indicated at 23. For locking the pin 19 in any position of adjustment the outermost ends of the flange portions 11 and 12 are slotted into the pin openings as indicated at 24 in Fig. 1 and clamping bolts 25 and 26 are provided edgewise through the bifurcated ends of the flanges whereby the portions of the pin extending through the flanges may be securely clamped in position.

The enlarged cylindrical end portion 28 of the pin 19 is flattened on one side as indicated at 29 providing clearance for the bolt 25 therepast. The bolt 25 engaging with the flattened portion 29 of the pin thus prevents rotational movement of the pin 19 but upon loosening of the clamping bolts 25, 26 longitudinal adjustment of the pin 19 is permitted.

An annular, or cylindrical, member 31 extending concentrically with and in a spaced relation about the pin 19 is provided with an integral extension 32 which is adapted to be rigidly secured such as by welding to the end of one arm 33 of the draft tongue. Arranged between the cylindrical member 31 and the pin 19 is a relatively thick walled bushing 34 of resilient compressible material, such as rubber or its equivalent, the outer surface of which bushing is of cylindrical shape having a diameter corresponding substantially to the inner diameter of the cylindrical member 31. The bore through the bushing 34 is tapered throughout the greater part of its length with the angle of taper corresponding generally to the angle of taper of the pin 20.

In the assembly of the mounting the cylindrical member 31 with the bushing 34 inserted therein is first positioned between the flanges 11 and 12 and with the clamping bolt 25 removed the pin 19 is then inserted longitudinally through the flange 11. The bore within the bushing 34 is of such diameter that the end of the pin 21 initially barely extends past the outer surface of the flange 12 so that the nut 22 may be threaded firmly thereupon. The bolt 25 is then inserted loosely in place to prevent rotation of the pin 19 and the pin is then drawn tight by the nut 22. By virtue of the central tapered portion 20 of the pin 19, as the nut 22 is tightened the bushing 34 is expanded so as tightly to compress it against the inner surface of the surrounding cylindrical member 31. In order to minimize extrusion of the bushing material past the opposite ends of the cylindrical member 31 annular ribs 36 and 37 are provided upon the inner surfaces of the flanges 11 and 12, respectively, concentrically about the pin openings. The bushing 34 may be thus readily compressed to such a degree as may be necessary to hold the tongue arms 33 in a predetermined horizontal position even though the outer end thereof may be unsupported for facilitating the coupling of the outer end thereof to the rear end of a truck vehicle. While the tongue may thus be firmly supported against hinging movement due to its own weight the bushing material is nonetheless sufficiently resilient to permit such hinging movement as may be necessary during normal running conditions when the rear end of the truck and the forward end of the trailer will experience certain vertical movements relative to each other.

In usage over prolonged periods of time the bushing 34 may become worn or otherwise deteriorated to the point that its replacement is necessary and which replacement may readily be effected simply by removing bolt 25, loosening bolt 26, removing nut 22 and driving the pin 19 endwise from the assembly. Due to the taper on both the pin 19 and of the bore of the bushing 34 the pin 19 may readily be freed of the bushing. The cylindrical member 31 may then be removed from between the flanges 11 and 12 and since the outward pressure exerted against the inner surface of the bushing is relieved the bushing 34 may easily be removed from the cylindrical member for the insertion of a new bushing.

Figure 3:
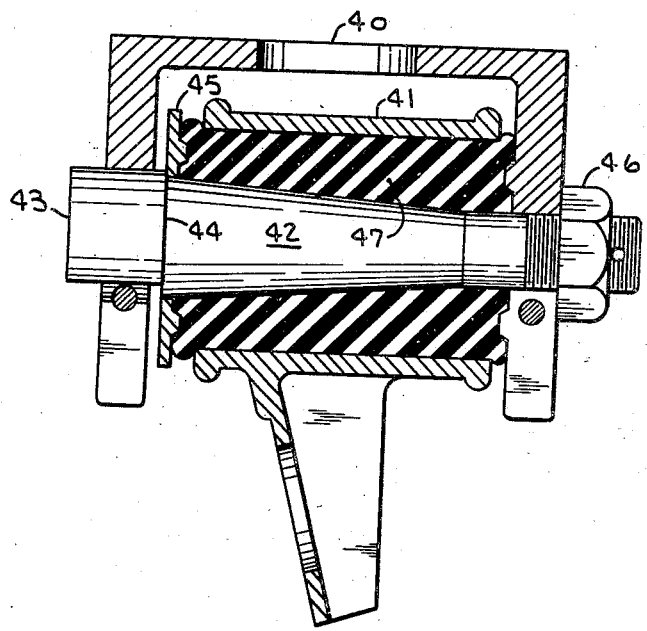

In the modification of the invention illustrated in Fig. 3 the supporting block member 40 is substantially similar to the supporting block 10 as previously described. The cylindrical member 41 for rigid attachment to the end of the tongue arm is also similar to the corresponding member 31 as previously described except that it is somewhat shorter for reasons as will be more fully described hereinafter. The pin 42 is somewhat similar to the pin 19 as previously described except that the large cylindrical end 43 has a diameter somewhat greater than the end of the adjacent tapered surface so that a right angular shoulder 44 is provided therebetween and facing toward the opposite end of the pin 42. An annular ring 45 is provided about the pin 42 and engages with the shoulder 44 so that it is axially movable with the pin 42 upon adjustment of the nut 46 and engages with the adjacent end of the bushing member 47. Upon tightening of the nut 46 and upon resultant longitudinal movement of the pin 42 the bushing 47 is expanded and compressed against the inner surface of the cylindrical member 41 in the same manner as described in connection with the modification shown in Figs. 1 and 2. Further, the annular ring 45 engaging with the adjacent end of the bushing 47 exerts a compressive force upon the bushing in a longitudinal direction of the pin 42 simultaneously with the radial compression. The surface of the ring 45 next adjacent the bushing 47 is provided with a concentric annular rib for minimizing the extrusion of the bushing material through the gap between the ring and the adjacent end of the cylindrical member 41.

Figure 4:
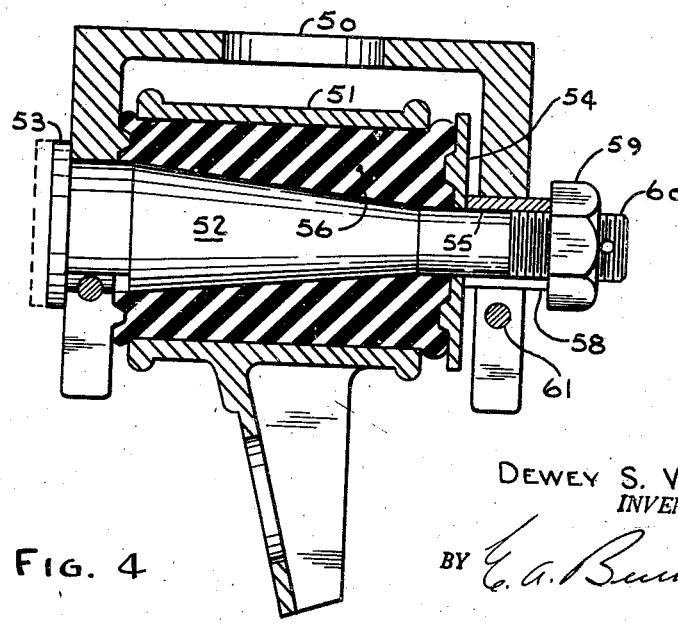

The modification shown in Fig. 4 combines certain of the features of the two preceding modifications. In this instance the supporting block 50 and the cylindrical member 51 attached to the end of the tongue arm are similar to the corresponding elements of the preceding modification while the pin 52 in this case is similar to the pin 19 of the first modification except that it is provided with an enlarged head 53 integral with the large end thereof. An annular ring 54 is provided about the small diameter cylindrical end portion 55 of the pin between the inner surface of the adjacent flange of the supporting block 50 and which is adapted to engage with the adjacent end of the rubber bushing member 56. The opening in the flange of the supporting block about the small diameter end of the pin 52 is enlarged for cooperatively receiving a longitudinally split sleeve 58 which is of a length greater than the thickness of the flange and extends between the ring 54 and the nut 59 threaded onto the end 60 of the pin.

In the assembly of this structure, as the pin 52 is first inserted in position the enlarged head 53 will be spaced somewhat outwardly from the outer surface of the adjacent flange of the supporting block 50 as indicated by dotted lines. As the nut 59 is then tightened pressure will be exerted against the ring 54 and the adjacent end of the bushing member 56 and the pin 52 will first be drawn longitudinally through the bushing so as to expand the bushing and compress it radially between the tapered mid-section of the pin and the inner surface of the cylindrical member 51. Upon continued tightening of the nut 59 the enlarged head 53 will ultimately be drawn into contacting engagement with the adjacent surface of the supporting block flange whereupon further longitudinal movement of the pin will be precluded while compression of the bushing 56 in the axial direction thereof will be effected by movement of the ring 54 axially thereagainst.

As mentioned, the sleeve 58 about the cylindrical end portion 55 of pin 52 is longitudinally split so as to be compressible upon tightening of the clamping bolt 61 extending edgewise through the corresponding flange of the supporting block. Thus following an adjustment of the pin 52 it may be firmly secured in place by the clamping bolts through both flanges of the bearing block and thus relieving the nut 59 of continous load thrust.

In the modifications of Figs. 3 and 4 tightening of the tongue mounting is accomplished by endwise compression of the rubber bushing upon a tapered pin. It will be obvious to those skilled in the art that it is not essential to the present invention that the taper be provided upon the pin since the same wedging action of the bushing may be accomplished equally well by providing the tapering surface on the inner wall of the outer annular member. In such case the pin may be cylindrical throughout its length and having a collar thereabout engaging one end of the bushing for effecting endwise compression thereof.

Figure 5:
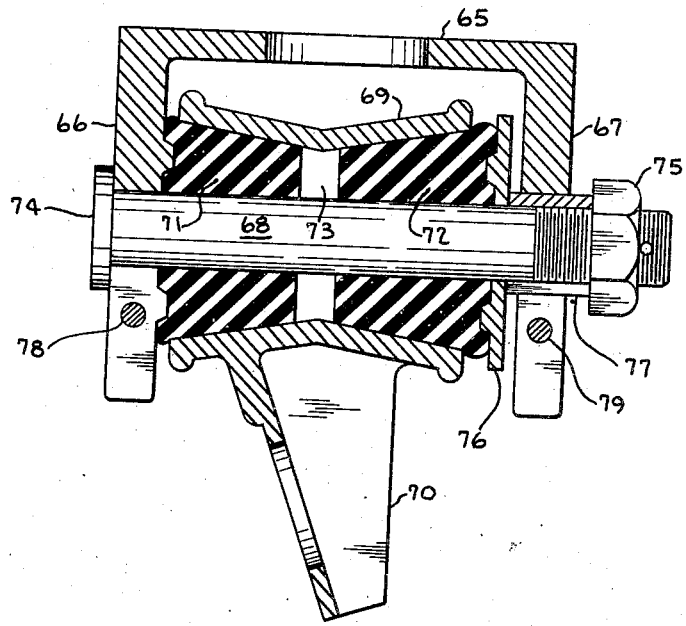

This variation is embodied in the modification illustrated in Fig. 5 which discloses a supporting block member 65 substantially similar to the block members as previously described but having opposite side walls 66 and 67 drilled for receiving a cylindrical pin 68 therethrough. Surrounding the pin 68 is a double frusto-conically tapered annular member 69 which is provided with an integral extension 70 for attachment thereto of a tongue arm. Arranged about the pin 68 within the annular member 69 are a pair of frusto-conically shaped bushings 71 and 72 which are of such a length that a relatively wide gap 73 is provided between the inner ends to allow for movement of the bushings toward each other. The pin 68 is provided with a head 74 at one end and is threaded at the other end having a nut 75 arranged thereupon. Arranged about the pin 68 adjacent the threaded end is a compression collar 76 which is adapted to be engaged by the end of a split sleeve 77 extending through the flange 67 of the supporting block. By tightening of the nut 75 force is transmitted through the sleeve 77 against the collar 76 which will exert an endwise pressure against the bushings 71 and 72 so as to wedge them between the relatively tapered surfaces of the pin 68 and the surrounding annular member 69 whereby the necessary degree of tightness of the mounting may be effected. The ends of the flanges 66 and 67 of the supporting block 65 are split as in the previous instances and bolts 78 and 79 are provided therethrough in order that the opposite ends of the pin 68 may be firmly clamped in place not only to prevent rotational movement of the pin 68 but also to relieve the head 74 and the nut 75.

Figure 6:
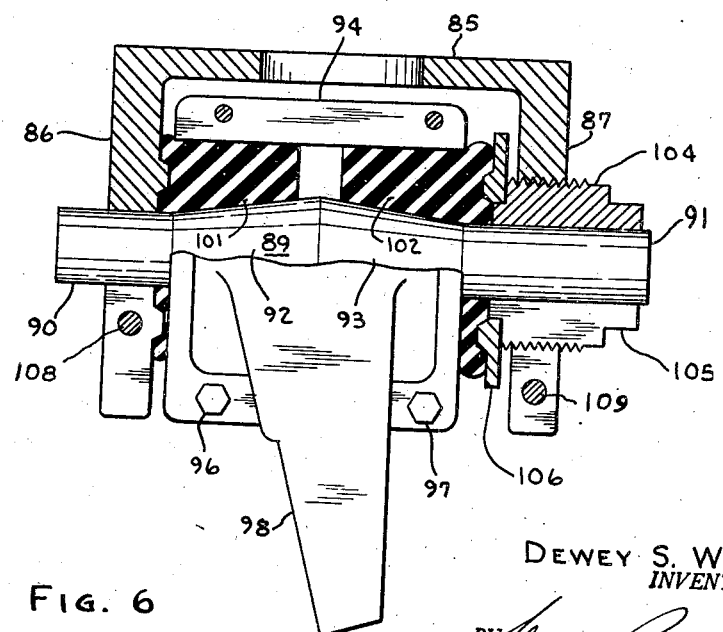

The modification shown in Fig. 6 is a still further embodiment of the present invention similar in some respects to the modification of Fig. 5 except that instead of providing a double taper upon the annular member surrounding the pin, the pin itself is provided with a double taper. The structure of this modification includes supporting block member 85 having opposite side flanges 86 and 87. A pin 89 is provided in this instance which is cylindrical at its opposite ends 90 and 91 and tapered from the cylindrical end portions toward the center as indicated at 92 and 93. Surrounding the pin 89 is an annular member 94 having a cylindrical inner wall, the member 94 being split lengthwise into two semi-cylindrical halves, the two halves being adapted to be bolted together during the assembly of the device such as by bolts 96 and 97. In this instance the tongue mounting extension 98 may be formed integrally with the upper half of the annular member 94. Surrounding the two tapered surface portions 92 and 93 of the pin are corresponding bushings 101 and 102 which bushings have cylindrical outer surfaces but tapered bores so as cooperatively to fit snugly about the tapered surfaces 92 and 93 of the pin 89.

In order to facilitate the assembly of the pin 89 within the supporting block 85 one of the side flanges such as 87, is provided with an enlarged opening having a diameter somewhat greater than the enlarged central portion of the pin 89. Cooperatively threaded within this enlarged opening is an externally threaded nut 104 having a cylindrical bore therethrough for cooperatively and slidingly receiving the end 91 of the pin. The outermost end of the nut 104 is provided with an eternally squared portion 105 for application of a wrench thereto. Surrounding the cylindrical end 91 of the pin is a ring 106 which is adapted to be engaged by the inner end of the nut 104 and upon tightening of such nut to exert a clamping pressure against the adjacent end of the bushing 102. The opening in the ring 106 is large enough to permit passage of the enlarged central portion of pin 89 therethrough. The nut 104 is preferably split along one side so that upon tightening of the bolts 108 and 109 through the split ends of the flanges 86 and 87 the pin 89 may be rigidly secured against rotation. The bushings 101 and 102 are split lengthwise along one side in order that they may be assembled about the pin 89 after it has been inserted through the cooperating openings in the side flanges 86 and 87 and before the halves of the annular member 94 are assembled thereabout. Prior to the assembly of the annular member 94 about the bushings 101, 102, the nut 104 is first screwed back and after the annular member 94 has been assembled, then the nut 104 may be tightened to compress the bushings 101 and 102 between the pin 89 and the member 94. The bolts 108 and 109 may then be tightened to secure the pin 89 firmly against rotation.

Having described the invention in what are considered to be preferred embodiments thereof, it is desired that it be understood that the specific details shown are merely illustrative and that the invention may be carried out by other means.

What I claim is:

1. In a vehicle tongue mounting arrangement the combination comprising a supporting member including a pair of parallel spaced apart flanges, said member being adapted to be rigidly secured to the end of a vehicle, a pin extending through cooperating openings in said flanges, an annular member adapted to be rigidly secured to the end of a tongue arm, said annular member extending in a relatively widely spaced relation about said pin between said flanges, the facing surfaces of said pin and said annular member being tapered longitudinally with respect to each other, an annular bushing of resilient compressible material arranged about said pin filling the space between said pin and said annular member, the surfaces of said bushing next adjacent said pin and said annular member being tapered so as cooperatively to fit the relatively tapered surfaces of said pin and said annular member, and means for causing wedging of said bushing between said relatively tapered surfaces of said pin and said annular member to effect tightening of the mounting between said annular member and said supporting member.

2. In a vehicle tongue mounting arrangement the combination comprising a supporting member defining a pair of spaced apart flanges, said supporting member being adapted to be rigidly secured to the end of a vehicle, an annular member mounted between said flanges and adapted to be rigidly secured to one end of a tongue arm, a pin extending through said annular member and said flanges, said annular member being relatively widely spaced from said pin, a relatively thick compressible resilient bushing arranged about said pin and filling the space between said pin and said annular member, the facing surfaces of said pin and said annular member being tapered relative to each other and with the adjacent surfaces of said bushing being correspondingly tapered, and means for causing endwise compression of said bushing to cause wedging thereof between said relatively tapered surfaces of said pin and said annular member.

3. In a vehicle tongue mounting arrangement the combination comprising a supporting member defining a pair of spaced apart flanges adapted to be rigidly secured to the end of a vehicle, a cylindrical member mounted between said flanges and adapted to be rigidly secured to one end of a tongue arm, a pin mounting means extending through said cylindrical member and said flanges, a rubber bushing surrounding said pin mounting means, a nut on one end of said pin mounting means, said pin mounting means including a longitudinally tapered outer surface portion for causing compression of said rubber bushing upon adjustment of said nut.

4. In a vehicle tongue mounting arrangement the combination comprising a supporting block including a pair of parallel spaced apart flanges and adapted to be rigidly secured to an end of the vehicle, an annular member mounted between said flanges adapted to be rigidly secured to an end of a tongue arm, a pin extending between said flanges and through said annular member, a rubber bushing surrounding said pin and fitting tightly between said pin and the inner surface of said annular member, said pin being longitudinally slidable relative to said flanges and said annular member, a nut on the end of said pin for effecting longitudinal adjustment thereof, and means on said pin for effecting compression of said rubber bushing upon adjustment of said nut.

5. In a vehicle draft tongue mounting arrangement the combination comprising a supporting member including a pair of parallel spaced apart flanges adapted to be rigidly secured to the end of a vehicle, a pin extending through cooperating openings in said flanges said pin being tapered between said flanges and longitudinally movable relative thereto, a member surrounding said pin in a spaced relation with respect thereto and adapted to be secured to the end of a tongue arm, a relatively thick compressible resilient bushing arranged about said tapered pin portion, an adjusting nut on one end of said pin for adjusting the relative longitudinal position thereof with respect to said flanges, an annular member surrounding said pin between said flanges and engaging with an adjacent end of said bushing, said annular member being effective upon tightening of said nut in compressing said bushing longitudinally of said pin and said tapered pin portion being effective for radially compressing said bushing about said pin against the inner surface of said surrounding member.

6. A vehicle tongue mounting arrangement including a member having a pair of spaced apart parallel flanges and adapted to be rigidly secured to the end of a vehicle, a cylindrical member arranged between said flanges adapted to be rigidly secured to the end of a tongue arm, a horizontally arranged pin extending through cooperating aligned openings in said flanges and through said cylindrical member arranged therebetween, said pin being of relatively small diameter at one end and tapered to a relative large diameter at the opposite end, the small end of said pin being threaded and having a nut arranged thereupon on the outer surface of the corresponding flange, a rubber bushing surrounding said pin and filling the space between said pin and said cylindrical member, said rubber bushing being adapted to be expanded into firm engagement with the inner surface of said cylindrical member by said tapered pin upon tightening of said nut.

7. In a vehicle draft tongue mounting arrangement the combination comprising a supporting member having a pair of parallel spaced apart flanges adapted to be rigidly secured to the end of the vehicle, an annular member adapted to be rigidly secured to the end of a tongue arm, said annular member being arranged between said flanges of said supporting member, a pin extending through cooperating openings in said flanges and concentrically through said annular member, a relatively thick annular rubber bushing arranged about said pin, means for precluding rotation of said pin relative to said supporting member, one end of said pin projecting beyond the outer surface of one of said flanges, said projecting pin end being threaded and having a nut cooperatively mounted thereupon and means responsive to the tightening of said nut for effecting compression of said bushing for tightening said pin relative to said annular member.

8. In a vehicle draft tongue mounting arrangement the combination comprising a supporting member including a pair of parallel spaced apart flanges adapted to be rigidly secured to the end of a vehicle, a pin extending through cooperating openings in said flanges, said pin being tapered between said flanges and longitudinally movable relative thereto, a cylindrical member adapted to be rigidly secured to the end of a tongue arm and extending concentrically and in a spaced relation about said pin, a relatively thick compressible resilient bushing arranged about said pin within said cylindrical member, the small diameter end of said pin extending from the outer surface of the adjacent flange, a nut threadably arranged upon said projecting end, the tightening of said nut being adapted to cause longitudinal movement of said pin through said bushing and compression of said bushing between said pin and said cylindrical member for tightening said cylindrical member relative to said supporting member.

9. In a vehicle draft tongue mounting arrangement the combination comprising a supporting member including a pair of parallel spaced apart flanges adapted to be rigidly secured to the end of a vehicle, a pin having a relatively large diameter cylindrical portion at one end and a relatively small diameter cylindrical portion at the opposite end, said cylindrical portions of said pin being arranged in cooperative openings in said flanges, said pin being tapered between said cylindrical portions and between said flanges, a member surrounding said pin in a spaced relation with respect thereto and adapted to be secured to the end of a tongue arm, a bushing of compressible material arranged about said pin and having a bore corresponding to the taper of said pin, and means for longitudinally adjusting said pin for compressing said bushing radially against the inner surface of said surrounding member.

10. In a vehicle draft tongue mounting arrangement the combination comprising a supporting member including a pair of parallel spaced apart flanges adapted to be rigidly secured to the end of a vehicle, a pin having a relatively large diameter cylindrical portion at one end and a relatively small diameter cylindrical portion at the opposite end, said cylindrical portions extending through cooperating openings in corresponding flanges, the ends of said flanges being slotted into said openings, bolts extending edgewise through said flanges for effecting clamping engagement of said cylindrical portions of said pin within said openings, the large diameter end of said pin being flattened on one side, said flattened side being engaged by the adjacent clamping bolt for precluding rotational movement of said pin, the small diameter end of said pin projecting from the outer surface of the adjacent flange end being threaded and having an adjusting nut thereon, said pin being uniformly tapered between said flanges and between said cylindrical portions, a member surrounding said pin between said flanges and adapted to be rigidly secured to the end of a tongue arm, a relatively thick compressible resilient bushing arranged about said pin and having a bore shaped to correspond generally with the outer surface of said pin between said flanges, the tightening of said nut causing radial compression of said bushing against the inner surface of said surrounding member.

11. A tongue mounting arrangement comprising a member having a pair of spaced apart parallel flanges and adapted to be rigidly secured to the forward end of a vehicle, a cylindrical member adapted to be secured to the end of a tongue arm, said cylindrical member being horizontally arranged between said flanges, a tapered pin extending through cooperating openings in said flanges and through said cylindrical member, the small end of said pin being threaded and having a nut arranged thereupon on the outside of the corresponding flange, a rubber bushing arranged about said pin and filling the space between said pin and said cylindrical member, a shoulder formed on said tapered pin adjacent the large end thereof and the inner side of the adjacent flange, a collar about said pin engaging with said shoulder and adapted for compressing said rubber bushing upon tightening of said nut.

12. In a vehicle draft tongue mounting arrangement the combination comprising a supporting member having a pair of parallel spaced apart flanges adapted to be rigidly secured relative to the end of the vehicle, a pin extending through cooperating openings in said flanges and longitudinally movable therewithin, one end of said pin projecting from the outer surface of one of said flanges, means for precluding relative rotation of said pin with respect to said flanges, a cylindrical member adapted to be rigidly secured to the end of the tongue arm, said cylindrical member being arranged concentrically and in a spaced relation about said pin, a relatively thick compressible resilient bushing arranged about said pin within said cylindrical member, an annular member extending about said pin and engaging one end of said bushing, said bushing being adapted to be compressed by said annular member upon tightening of said nut.

13. In a vehicle draft tongue mounting arrangement the combination comprising a supporting member including a pair of parallel spaced apart flanges and adapted to be rigidly secured to the end of a vehicle, a pin extending through cooperating openings in said flanges and longitudinally movable therewithin, one end of said pin projecting from the outer surface of one of said flanges and having an adjusting nut threaded thereupon, means for precluding relative rotation of said pin with respect to said flanges, a cylindrical member adapted to be rigidly secured to the end of a tongue arm, said cylindrical member being arranged concentrically and in a spaced relation about said pin, a relatively thick compressible resilient bushing arranged about said pin within said cylindrical member, a shoulder formed on the end portion of said pin opposite said nut and between said flanges, an annular member engaging said shoulder and adapted upon tightening of said nut to engage with the adjacent end of said bushing to compress the same between said pin and said cylindrical member.

14. In a vehicle draft tongue mounting arrangement the combination comprising a supporting member including a pair of parallel spaced apart flanges adapted to be rigidly secured to the end of a vehicle, a pin having a relatively large diameter cylindrical portion at one end and a relatively small diameter cylindrical portion at the other end, said cylindrical portions extending through cooperating openings in said flanges, the central portion of said pin being tapered between said cylindrical portions, the outer ends of said flanges being slotted and a clamping bolt extending through said slotted ends for clamping said flanges tightly about said respective cylindrical pin portions, a cylindrical member adapted to be rigidly secured to the end of a tongue arm, said cylindrical member being arranged concentrically and in a spaced relation about said pin, a compressible resilient bushing arranged about said pin within said cylindrical member, said bushing having a bore tapered to correspond with the taper of said pin, and means for causing longitudinal movement of said pin through said bushing for effecting radial compression thereof against said cylindrical member.

15. In a vehicle draft tongue mounting arrangement the combination comprising a supporting member including a pair of parallel spaced apart flanges, said supporting member being adapted to be rigidly secured to the end of a vehicle, a pin extending through cooperating openings in said flanges, means on said flanges for precluding rotational movement of said pin in said openings, an annular member surrounding said pin in a spaced relation with respect thereto, the inner surface of said annular member being frusto-conically tapered, an annular bushing of resilient compressible material arranged about said pin and having an outer surface tapered so as cooperatively to fit snugly against the tapered inner surface of said annular member, and means for engaging the large end of said bushing for forcibly wedging the same between said pin and said annular member.

16. In a vehicle draft tongue mounting arrangement the combination comprising a supporting member including a pair of parallel spaced apart flanges, a pin extending through cooperating openings in said flanges, an annular member extending about said pin, said annular member being adapted to be rigidly secured to the end of a tongue arm, the facing surfaces of said pin and said annular member being longitudinally tapered relative to each other in opposite directions from the center of said annular member, the space between said relatively tapered surfaces being smallest at the center of said annular member, a pair of annular bushings of resilient compressible material arranged about said pin on the opposite sides of said center, the surfaces of said bushings next adjacent said pin and said annular member fitting cooperatively against said relatively tapered surfaces of said pin and said annular member, and means for exerting a pressure between the opposite ends of said two bushings to effect wedging of said bushings between said relatively tapered surfaces.

17. In a vehicle tongue mounting arrangement the combination comprising a pair of members adapted to be rigidly secured to the end of a vehicle and the end of a tongue arm respectively, the first of said members having a pair of parallel spaced apart flanges, the second of said members being mounted between said flanges, transverse means extending through cooperating openings in said flanges and the member therebetween, means for preventing relative rotation between one of said members and said transverse means, the facing surfaces of said transverse means and the other of said members being tapered longitudinally relative to each other and spaced apart, a bushing of resilient compressible material arranged about said transverse means filling the space between said transverse means and said other member, and means for causing wedging of said bushing between said relatively tapered surfaces of said transverse means and said other member to effect tightening of the mounting between said pair of members.

18. In a vehicle tongue mounting arrangement, the combination comprising a pair of members adapted to be fixedly secured to the end of a vehicle and to the end of a tongue arm respectively, a first of said members having a pair of spaced apart flanges, the second of said members being mounted between said flanges, transverse mounting means extending through cooperating openings in said flanges and the member mounted therebetween, means for preventing relative rotation between said mounting means and one of said members, facing portions of the surfaces of said transverse mounting means and the other of said members being spaced apart for diverging with respect to each other in a direction longitudinally of said mounting means, a bushing of resilient compressible material arranged about said mounting means and filling the space between said mounting means and said other member, portions of the longitudinal surfaces of said bushing diverging with respect to each other so as cooperatively to fit the relatively diverging surface portions of said mounting means and said other member, and adjustable means for causing wedging of said bushing between said diverging surfaces of said transverse mounting means and said other member to effect tightening of the connection between said first and second members.

19. In a vehicle tongue mounting arrangement, the combination comprising a pair of members adapted to be fixedly secured to the end of a vehicle and to the end of a tongue arm respectively, a first of said members having a pair of spaced apart flanges, the second of said members being mounted between said flanges, transverse mounting means extending through cooperating openings in said flanges and said second member, means for securing one of said members to said transverse mounting means to prevent relative rotation therebetween, facing portions of the surfaces of said transverse mounting means and the other of said members diverging with respect to each other in a direction longitudinally of said transverse mounting means, a bushing of resilient compressible material arranged about said transverse mounting means and filling the space between said mounting means and said other member, and adjustable means arranged about said transverse mounting means and engaging with an end of said bushing for causing compression and wedging of said bushing between said diverging surface portions of said mounting means and said other member to effect tightening of the connection between said first and second members.

20. In a vehicle tongue mounting arrangement, a combination comprising a pair of members adapted to be fixedly secured to the end of a vehicle and to the end of a tongue arm respectively, transverse mounting means nonrotatably secured to one of said members and extending through a cooperating opening in the other of said members, facing portions of the surfaces of said transverse mounting means and said other member diverging with respect to each other in a direction longitudinally of said mounting means, a bushing of resilient compressible material arranged about said mounting means and filling the space between said mounting means and said other member, and adjustable means arranged adjacent one end of said transverse mounting means for effecting relative longitudinal adjustment between said bushing and effecting wedging of said bushing between said relatively diverging surface portions and tightening of the connection between said first and second members.

DEWEY S. WEISS.

REFERENCES CITED

The following references are of record in the file of this patent:

UNITED STATES PATENTS

| Number | Name | Date |
|---|---|---|
| 2,189,170 | Gaussoin | Feb. 6, 1940 |
| 175,305 | Shipherd | Mar. 28, 1876 |
| 293,906 | Musser | Feb. 19, 1884 |
| 666,620 | Emenaker | Jan. 22, 1901 |
| 370,210 | Rathbun | Sept. 20, 1887 |
| 371,170 | Burch | Oct. 11, 1887 |
| 1,848,956 | Koehler | Mar. 8, 1932 |

FOREIGN PATENTS

| Number | Country | Date |
|---|---|---|
| 620,176 | France | Jan. 15, 1927 |